United States Patent
Frost

(10) Patent No.: US 11,994,252 B2
(45) Date of Patent: May 28, 2024

(54) MAGNETIC PLATE WALL MOUNT

(71) Applicant: Jacob Frost, Andover, NH (US)

(72) Inventor: Jacob Frost, Andover, NH (US)

(*) Notice: Subject to any disclaimer, the term of this patent is extended or adjusted under 35 U.S.C. 154(b) by 0 days.

(21) Appl. No.: 17/880,291

(22) Filed: Aug. 3, 2022

(65) Prior Publication Data

US 2024/0044441 A1 Feb. 8, 2024

(51) Int. Cl.
| F16M 13/02 | (2006.01) |
| A47G 1/17 | (2006.01) |
| F16M 11/04 | (2006.01) |
| G03B 21/00 | (2006.01) |

(52) U.S. Cl.
CPC ........ *F16M 11/041* (2013.01); *F16M 13/027* (2013.01); *G03B 21/00* (2013.01); *A47G 1/17* (2013.01); *F16B 2200/83* (2023.08)

(58) Field of Classification Search
CPC .............. A47G 1/17; B60R 2011/0057; B60R 2011/007; F16B 2001/0035; F16B 2200/83; F16M 13/027; H01F 7/00
USPC .... 248/342, 343, 344, 317, 683, 206.5, 207, 248/309.4
See application file for complete search history.

(56) References Cited

U.S. PATENT DOCUMENTS

| 4,422,137 | A | * | 12/1983 | Watts ...................... F21V 21/02 |
| | | | | 362/147 |
| 5,131,205 | A | * | 7/1992 | Hermann .................. E04B 9/30 |
| | | | | 52/127.2 |
| 7,052,136 | B2 | | 5/2006 | Johnson |
| 7,445,346 | B2 | | 11/2008 | Rizzo |
| 7,582,828 | B2 | | 9/2009 | Ryan |
| 8,066,249 | B2 | | 11/2011 | Kerr |
| 8,879,149 | B2 | | 11/2014 | Kunze |
| 9,268,203 | B1 | | 2/2016 | List |
| 11,162,501 | B1 | * | 11/2021 | Dewitt .................. F04D 29/646 |
| 2004/0065798 | A1 | * | 4/2004 | Pitlor ...................... H02G 3/20 |
| | | | | 248/342 |
| 2005/0045784 | A1 | * | 3/2005 | Pitlor ...................... H02G 3/20 |
| | | | | 248/206.5 |
| 2008/0061200 | A1 | * | 3/2008 | Bouissiere ........... F16M 11/041 |
| | | | | 248/343 |
| 2010/0321646 | A1 | | 12/2010 | Nakano |
| 2012/0305727 | A1 | | 12/2012 | Bouissiere |
| 2013/0264434 | A1 | * | 10/2013 | Unno ...................... F16M 7/00 |
| | | | | 248/58 |
| 2020/0078246 | A1 | * | 3/2020 | Duvert ...................... F21S 8/04 |
| 2023/0129858 | A1 | * | 4/2023 | Anderson ........... A47B 96/028 |
| | | | | 211/90.01 |

FOREIGN PATENT DOCUMENTS

| WO | 2006096962 A1 | 9/2006 |
| WO | 2007070497 A3 | 6/2007 |

* cited by examiner

*Primary Examiner* — Alfred J Wujciak
(74) *Attorney, Agent, or Firm* — Lambert Shortell & Connaughton; David J. Connaughton, Jr.; Justin P. Tinger

(57) ABSTRACT

A dual plated magnetic plate mount comprising magnets, bolts, screws, and related hardware is disclosed herein. A magnetic cap and puck ceiling or wall mount for the consolidation or management of loose wires is also disclosed herein. The dual plated mount and magnetic cap and puck embodiments disclosed herein may be advantageously used to mount a projector to a wall or ceiling.

14 Claims, 7 Drawing Sheets

MAGNETIC PLATE WALL MOUNT

BACKGROUND

Technical Field

The present disclosure relates generally to a magnetic plate wall mount. More particularly the present disclosure relates to a dual plated mount comprising magnets, bolts, screws, and related hardware that may advantageously be used to mount a projector.

Description of Related Art

Digital video projectors are used every day throughout society. From movie theaters to conference rooms, these tools have become ubiquitous visual aids for both entertainment and business. Many times, the optimal use of a projector will require the projector to be mounted to a wall or ceiling, for example, in a home theater or office. Mounting a projector correctly is complicated and takes a significant amount of time to accomplish, especially for consumers who are unskilled in the use of power tools and other equipment necessary for proper placement and leveling of the device.

Moreover, even when a projector is mounted correctly, wires connecting the projector to a power source or another electrical device are often strewn all over the wall or ceiling where the projector is mounted. These wires may be consolidated or hidden by drilling holes in the wall or attaching a cord concealer strip; however, these tasks are also complicated and time consuming. In other words, there are numerous potential problems associated with the mounting of modern projectors, and there are also an equal or greater number of potential solutions to these problems.

Therefore, what is needed is a magnetic plate wall mount having the following characteristics and benefits over the prior art.

SUMMARY

The subject matter of this application may involve, in some cases, interrelated products, alternative solutions to a particular problem, and/or a plurality of different uses of a single system or article.

In on aspect, a magnetic plate mount is provided. In this aspect, the magnetic plate mount comprises a ceiling plate, a mounting plate, and the ceiling plate is magnetically connected to the mounting plate.

In another aspect, a magnetic plate mount is also provided. In this aspect, the magnetic plate mount generally comprises a ceiling plate having a plurality of countersunk mount holes, a mounting plate having a plurality of magnets within a plurality of countersunk mount holes, and a plurality of counterbored slots. In this aspect the magnetic plate mount also comprises a projector attached to the mounting plate via a projector hanger attached to both the mounting plate and the projector, and the mounting plate is magnetically attached to the ceiling plate, which is attached to a ceiling.

In yet another aspect, a method of installing the magnetic plate mount of the previous aspect is provided. In this aspect, the method comprises the steps of: attaching the ceiling plate to the ceiling by screwing a plurality of drywall screws into the ceiling through the countersunk mount holes in the ceiling plate; attaching the mounting plate to a projector hanger mounting frame by screwing bolts through both the mounting frame and the counterbored slots in the mounting plate; and magnetically attaching the mounting plate to the ceiling plate.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

DETAILED DESCRIPTION

Figure 1:
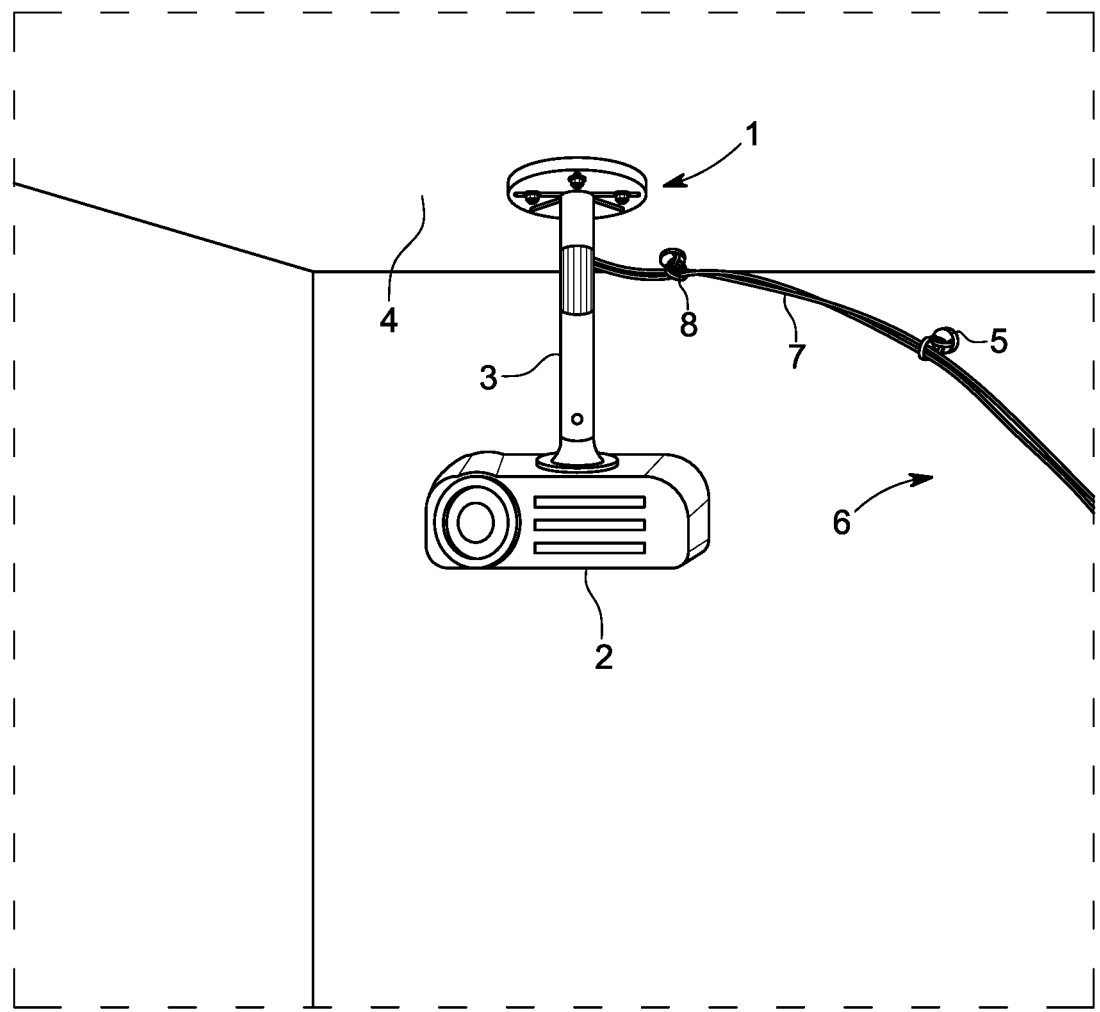
FIG. 1 provides a perspective view of an embodiment of the present disclosure mounted to a ceiling.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a two-plate mount comprising magnets, bolts, screws, and related hardware. The present disclosure also concerns a magnetic cap and puck ceiling or wall mount for the consolidation or management of loose wires. While the dual plated mount and magnetic cap and puck embodiments disclosed herein may be advantageously used to mount a projector to a wall or ceiling, the structures and functions disclosed herein may also be used in other ways without straying from the scope of the present disclosure.

In some embodiments the dual plated mount may comprise a ceiling or wall plate and a mounting plate that may attach to one another via magnetic forces. In one embodiment, the ceiling or wall plate may be made of a metal material, and the mounting plate may comprise a magnet that magnetically attaches the mounting plate to the ceiling or wall plate. In another embodiment, the mounting plate may be made from a metal material, and the ceiling or wall plate may comprise a magnet that magnetically attaches the ceiling or wall plate to the mounting plate. In a preferred embodiment, the ceiling or wall plate is made from a steel material, and the mounting plate is made from a plastic material; however, in other embodiments, different types and combinations of materials may be used so long as the ceiling plate and the mounting plate attach via magnetic forces. Accordingly, in said preferred embodiment, the mounting plate comprises a plurality of securely recessed magnets that magnetically attach the ceiling or wall plate to the mounting plate.

Also, in a preferred embodiment, the ceiling plate and the mounting plate are circular in shape. A circular plate design may allow for easy rotation and adjustment during the mounting process. For example, in one embodiment, the mounting plate may be circular in shape and may comprise a slotted bolt or screw pattern for mounting an object. In the preferred embodiment, the mounting plate comprises a slotted bolt pattern for mounting a projector hanger. A circular design for the mounting plate may allow for easy rotation of the pattern to accommodate the bolt patterns of most projector hanger frames. Now, while a circular shape for both the ceiling and the mounting plates may be advantageous, it should be expressly understood that other shape designs (e.g., triangle, square, hexagon, etc.) for either or both plates are well within the scope of the present disclosure.

Depending on the embodiment, different slotted bolt patterns may also be used on the mounting plate. For example, in one embodiment, the slotted bolt pattern may comprise two counterbored slots. In other embodiments, the mounting plate may comprise any number of additional slots to accommodate a variety of projector hanger frames. In preferred embodiments, it has been determined that a slot pattern comprising anywhere from four to six slots on a circular mounting plate is critical, as a pattern with this number of slots may be compatible with the bolt patterns of most publicly available projector hangers.

Another critical aspect of the disclosure is the linear load strength of the magnets, both individually and in combination. In other words, it is critical that the magnetic forces holding the mounting plate and the ceiling plate together are sufficient to hold the combined weights of the projector, the projector hanger, and any ancillary components that may be hanging from the projector (e.g., cables). In one embodiment, the magnets holding the mounting plate and the ceiling plate together may be rated for at least 10 kilograms (kg), or approximately 22 pounds (lbs), combined linear load. These are critical measurements because the average weight of all publicly available projectors is approximately 5.5 lbs (~2.5 kg), and the average weight of publicly available projector hangers is approximately 2 lbs (~1 kg). When the term "approximately" is used herein, it should be understood that the term refers to a range of plus or minus fifty percent (50%) from the indicated measurement. Thus, a magnet or combination of magnets comprising a total linear load capacity of at least 11 lbs (~5 kg) is critical, and in another embodiment a total linear load capacity of at least 22 lbs (~10 kg) is preferred. In one embodiment, the combined linear load capacity of the magnet or plurality of magnets may be as high as 110 lbs (~50 kg).

In addition to providing a magnetic plate mount capable of functioning as a ceiling mount for most digital video projectors, another object of the present disclosure is to provide an aesthetically pleasing solution. Specifically, it may be desirable to remove a mounting plate attached to a projector and projector hanger from a ceiling plate attached to a ceiling or wall either to move the projector to another location, or to simply create overhead space in a room when the projector is not needed. In this situation, it may not be desirable to remove the ceiling plate, so it is critical that the ceiling plate blend in with the surrounding wall or ceiling to provide an aesthetically pleasing look.

Thus, in at least one embodiment, the thickness of the ceiling plate is critical. For example, in a preferred embodiment, it is critical that the thickness of the ceiling plate is approximately one sixteenth of an inch (~1/16"). In said preferred embodiment, when the ceiling plate is attached to the ceiling without the mounting plate, the ceiling plate may appear to be a recessed light at a quick glance. In other embodiments, the thickness of the ceiling plate may be greater than 1/16" without straying from the scope of the present disclosure.

In accordance with the combined objectives of providing a functional and aesthetically pleasing solution for solving the difficult and ugly ceiling projector installation problem, the present disclosure provides magnetic caps and mounting pucks for easy consolidation and management of cables. In one embodiment, the mounting pucks may comprise a metal material with an adhesive backing for adhering to a ceiling or wall, and a magnetic cap may attach to the mounting puck via magnetic forces. The magnetic caps may also comprise a structure for receiving cables. For example, in a preferred embodiment, the structure is an arch for receiving a hook and loop fastener strap. In said preferred embodiment, the hook and loop fastener strap may attach loose cables to the arch by wrapping around both the arch and cables. In other embodiments, different connection structures for connecting cables to the magnetic cap may be utilized without straying from the scope of the present disclosure (e.g., clips, slots, and the like).

Turning now to FIG. 1, which provides a perspective view of an embodiment of the magnetic plate mount 1 attached to a digital video projector 2 by a projector hanger 3. In this embodiment, the magnetic plate mount 1 secures the projector 2 to a ceiling 4 of a room, and magnetic caps 5 are attached to the ceiling 4 and wall 6 of the room. The magnetic caps 5 help to secure cables 7 to the walls 6, which prevents them from being a hazard, particularly in rooms where there is a paucity of space below the projector 2. In this embodiment, hook and loop fasteners 8, such as those produced by Velcro®, are used to secure the cables 7 to the magnetic caps 5 and the projector hanger 3.

Figure 2:
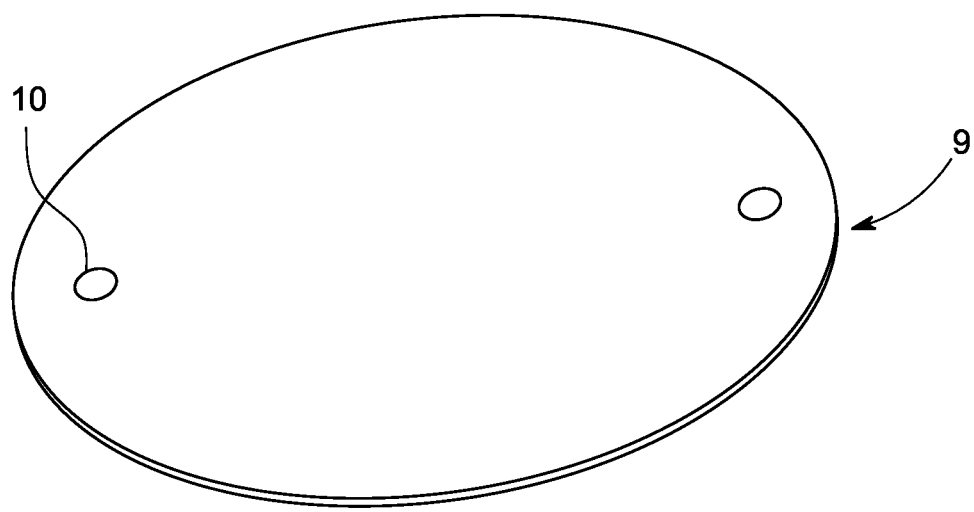
FIG. 2 provides a perspective view of an embodiment of a wall or ceiling plate according to the present disclosure.
Figure 3:
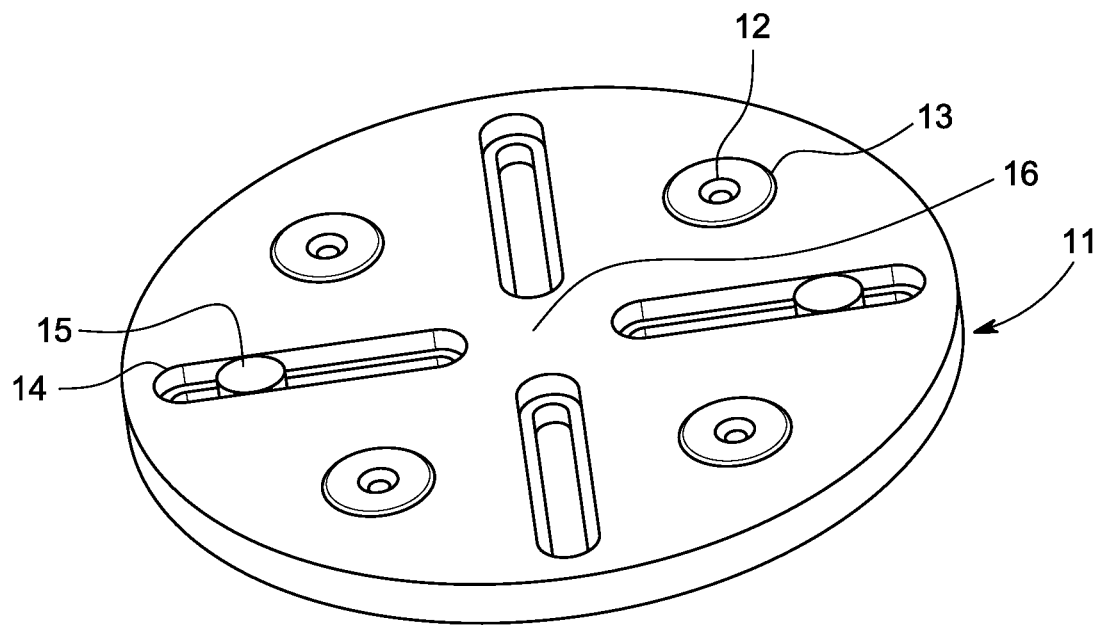
FIG. 3 provides a perspective view of an embodiment of a mounting plate according to the present disclosure.
Figure 4:
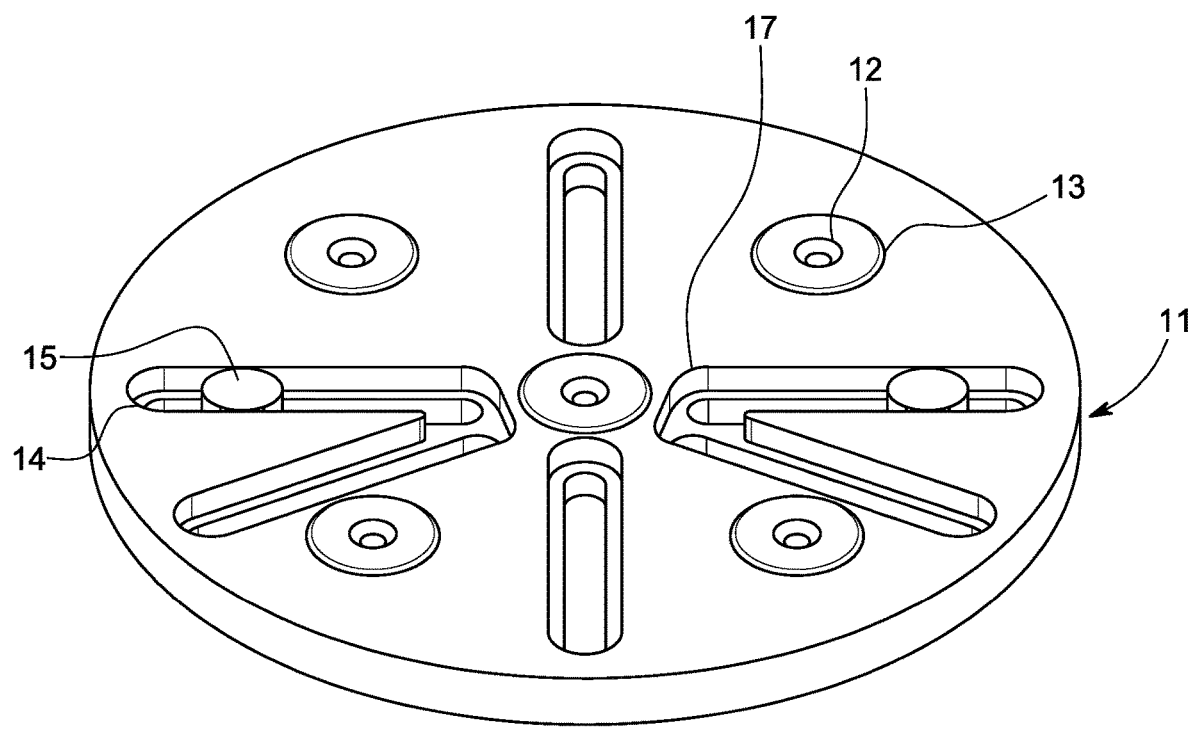
FIG. 4 provides a perspective view of another embodiment of a mounting plate according to the present disclosure.

The magnetic plate mount 1 comprises two primary components, a wall or ceiling plate 9, as shown in FIG. 2, and a mounting plate 11 as shown in FIGS. 3 and 4. In the embodiment shown in FIG. 2, the circular wall or ceiling plate 9 is made from a steel material and comprises two holes 10 for mounting to a ceiling or wall. In this embodiment, the ceiling plate holes 10 are countersunk, which means the holes are manufactured to allow for flush mounting of a screw or stud to the ceiling plate 9. Magnets 12 are also secured within countersunk mount holes 13, which allows the mounting plate 11 to be mounted flush with the ceiling plate 9. The flush mounting enabled by the countersunk holes 10 and 13, not only provides for a more secure connection between the mounting plate 11 and the ceiling plate 9, but it also provides for a clean aesthetic in the event that the ceiling plate 9 is ever mounted to a wall or ceiling without the mounting plate 11 being attached.

Figure 5:
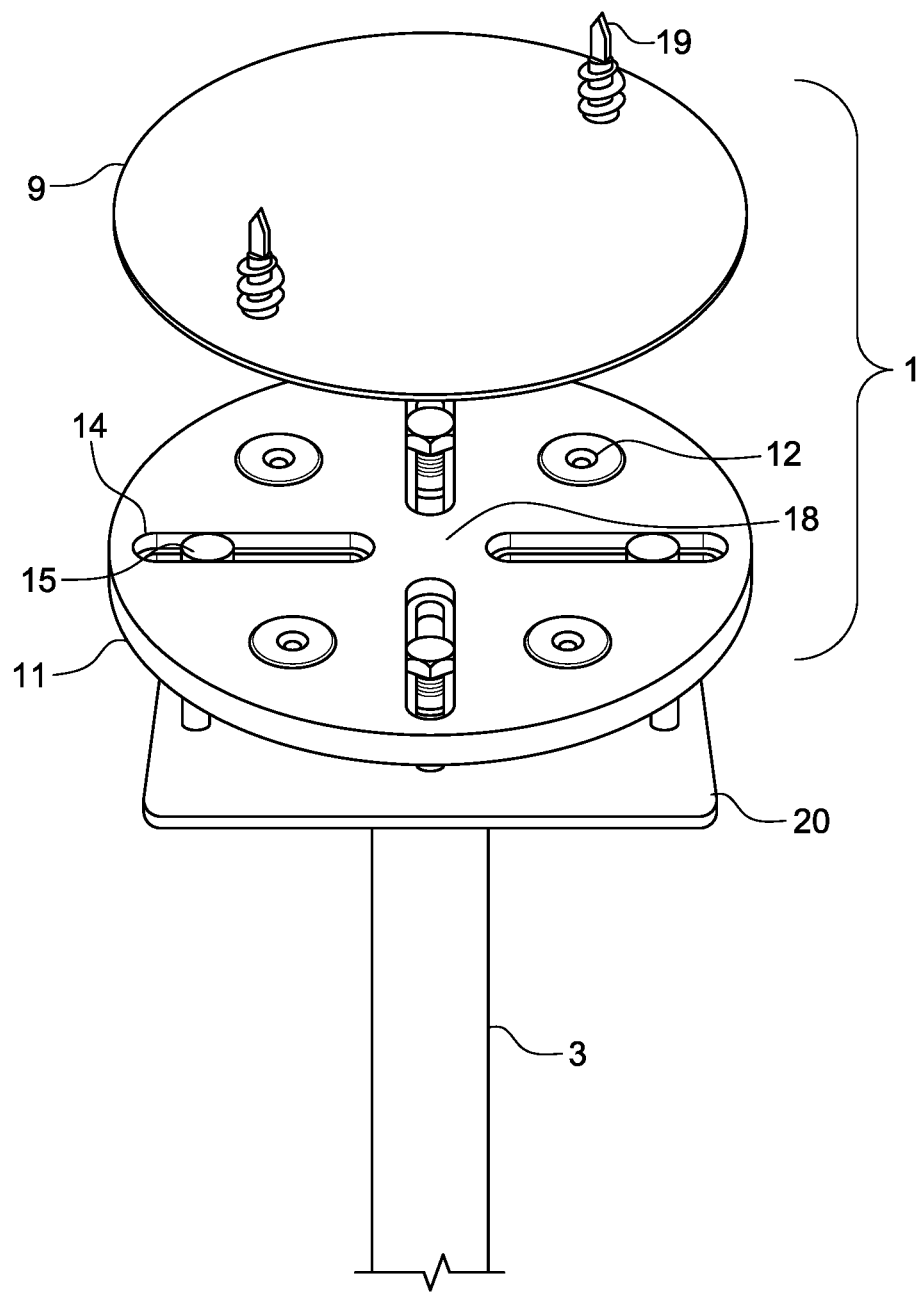
FIG. 5 provides a perspective view of an embodiment of the present disclosure being mounted to a projector hanger.

Similar to the countersunk holes 10 and 13 for the ceiling plate 9 and mounting plate 11, respectively, the mounting plate 11 also comprises counterbored slots 14, which allows for bolts 15 to be mounted flush to the mounting surface 18 of the mounting plate, as shown in FIG. 5. In one embodiment, the circular mounting plate 11 is manufactured with a cross shaped slot pattern 16, which comprises four counterbored slots 14. In another embodiment, the mounting plate 11 is manufactured with a variant pattern 17, which comprises six counterbored slots 14. While other slot patterns are possible, the cross shaped slot pattern 16, and the variant pattern 17 have been critically identified as being compatible with nearly all publicly available projector hangers 3.

Figure 6:
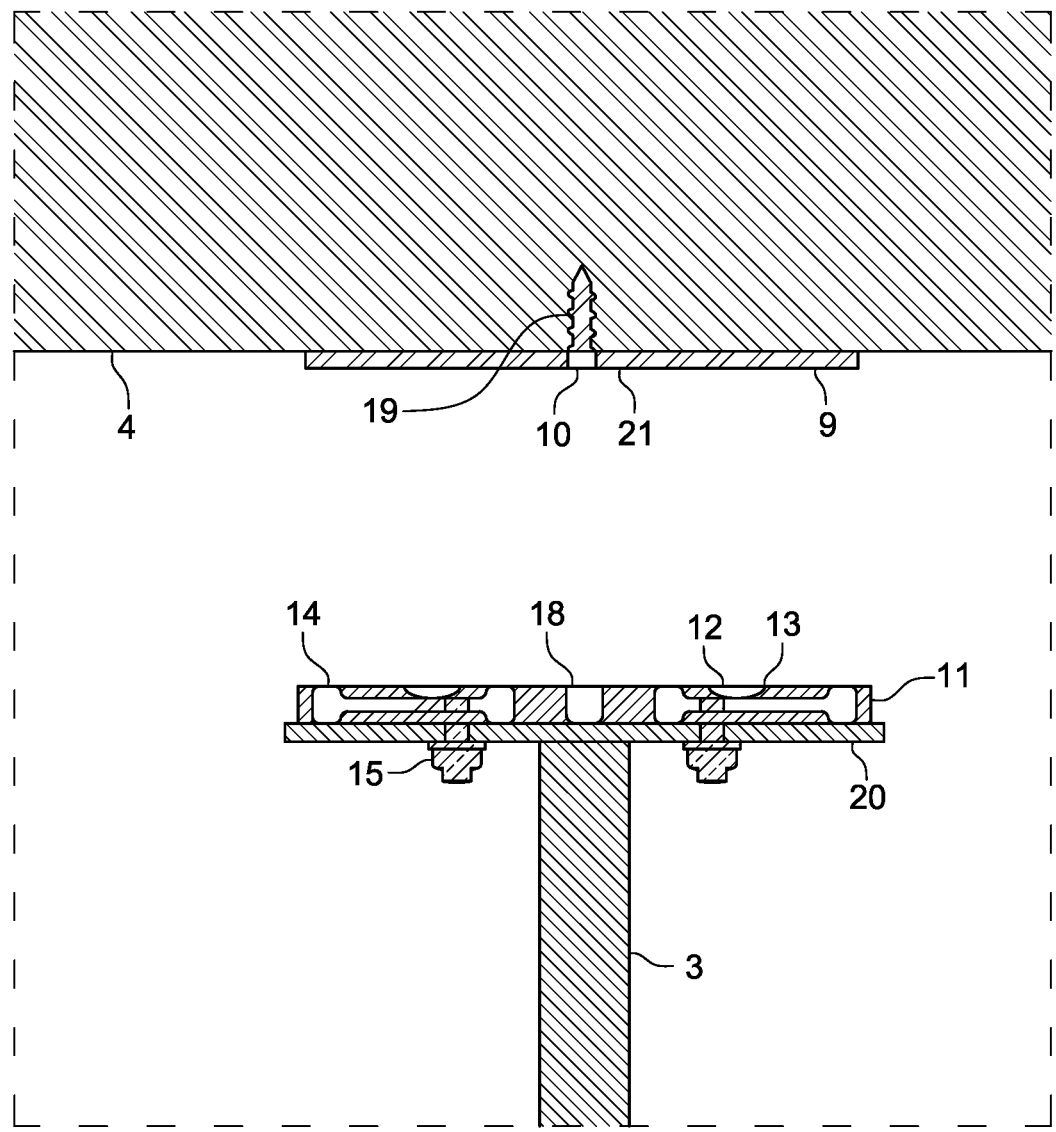
FIG. 6 provides a cross-sectional perspective view of an embodiment of the present disclosure being mounted to a projector hanger.

In order to properly mount the magnetic plate mount 1 attached to a projector hanger 3 to a wall or ceiling 4, the ceiling plate 9 should first be mounted to the ceiling 4 by a drywall screw or stud 19, as shown by the cross-sectional perspective view of the mounting process in FIG. 6. The mounting plate 11 is then bolted to the mounting frame 20 of the projector hanger 3, as shown in both FIGS. 5 and 6. When properly secured in the counterbored slots, the bolts 15 that attach the projector hanger 3 to the mounting plate 11 are flush with the mounting surface 18. Similarly, the drywall screws or studs 19 are preferably flush with the mounting surface 21 of the ceiling plate 9 once they are fully screwed into the countersunk mount holes 10. This allows the magnets 12, which are securely recessed within countersunk mount holes 13, to achieve maximum mounting strength. In the preferred embodiment the mounting surfaces 18 and 21 of the ceiling plate 9 and the mounting plate 11, respectively, are in complete contact when the magnetic plate mount 1 is properly mounted.

Figure 7:
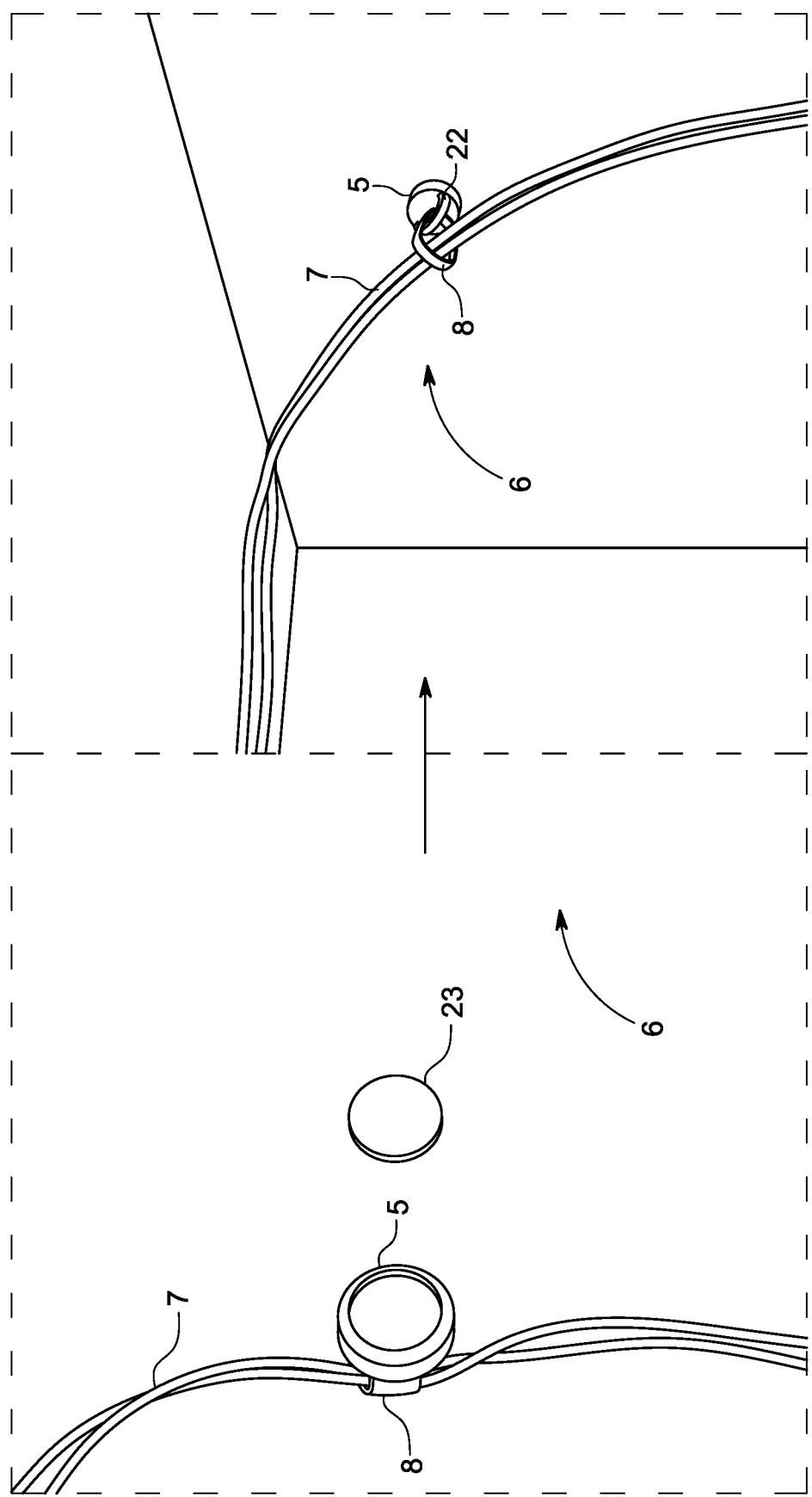
FIG. 7 provides a perspective view of an embodiment of a magnetic cap according to the present disclosure.
Figure 8:
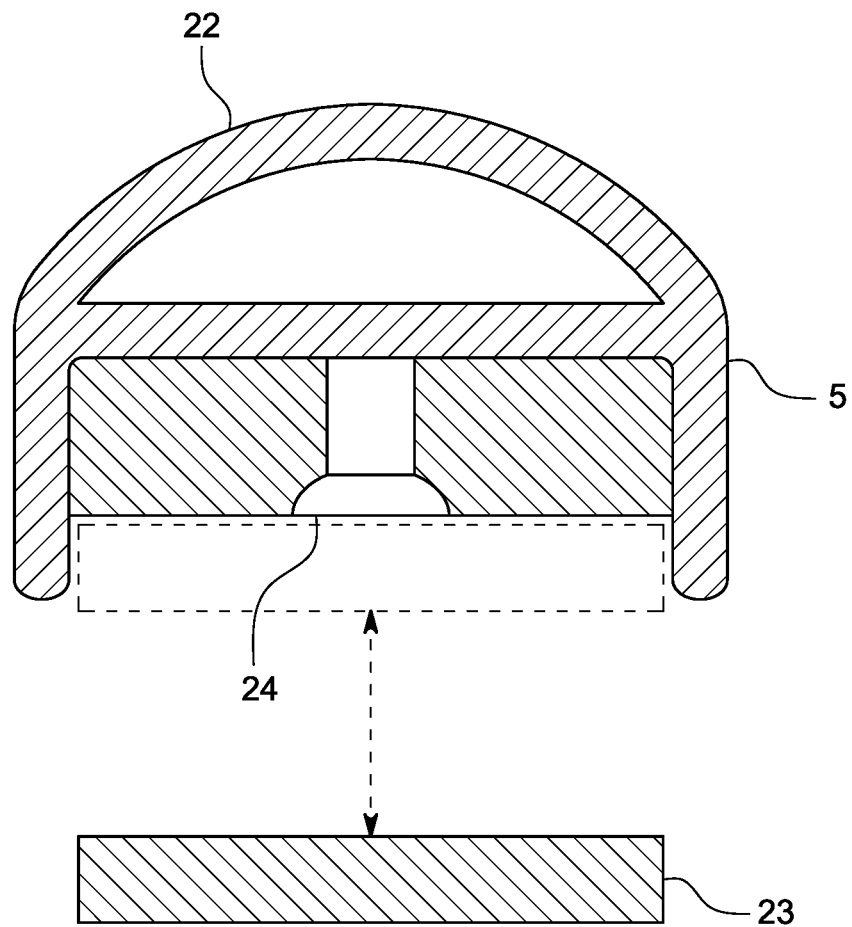
FIG. 8 provides a cross-sectional perspective view of an embodiment of a magnetic cap according to the present disclosure.

Once the magnetic plate mount 1 and projector hanger 3 are mounted to a ceiling 4, the cables 7 necessary for the operation of wired projectors may be secured to a ceiling or wall 6 by magnetic caps 5 outfitted with hook and loop fasteners 8, as shown in FIG. 7. In this embodiment, each magnetic cap 5 comprises an arch 22 for the connection of a hook and loop fastener 8. The hook and loop fastener 8 is threaded through the arch 22 and can be tightened to secure the cables 7 as close to the magnetic cap 5 as possible. The magnetic cap 5 is then secured to the wall 6 by attaching to a mounting puck 23. In this embodiment, the mounting puck 23 is made from a metal material and is adhered to the wall 6 through the use of an adhesive backing, for example, such as adhesive backings manufactured by 3M®, and the magnetic cap 5 comprises a plastic material. As shown in FIG. 8, in one embodiment the magnetic cap 5 comprises a clued-in magnet 24, which allows the cap 5 to magnetically attach or mate with the metal mounting puck 23. In other embodiments, different materials and ways of connecting a magnet to the magnetic cap may be used without straying from the scope of the present disclosure. For example, in another embodiment, the entire magnetic cap may comprise a magnetic material for attaching to the mounting puck. In yet another embodiment, a magnet may be screwed into a plastic magnetic cap, instead of being clued in.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth below.

What is claimed is:

1. A magnetic plate mount for supporting a digital video projector, comprising:
   a ceiling plate;
   a mounting plate, wherein the mounting plate comprises a plurality of magnets secured within a plurality of countersunk magnet mount holes;
   wherein the mounting plate further comprises a plurality of counterbored slots for holding a plurality of bolts;
   wherein a mounting surface of the mounting plate comprises the plurality of magnets, the plurality of countersunk magnet mount holes, the plurality of counterbored slots, and the plurality of bolts; and
   wherein the ceiling plate and the mounting plate are magnetically connected to suspend the projector;
   wherein a mounting surface of the ceiling plate and the mounting surface of the mounting plate are flush when the mounting plate is attached to the ceiling plate.

2. The magnetic plate mount of claim 1 wherein the ceiling plate comprises a steel material.

3. The magnetic plate mount of claim 1 wherein the ceiling plate comprises two mount holes for attaching two drywall screws.

4. The magnetic plate mount of claim 3 wherein the two mount holes are countersunk.

5. The magnetic plate mount of claim 1 wherein the mounting plate comprises four slots.

6. The magnetic plate mount of claim 1 wherein the mounting plate comprises six slots.

7. The magnetic plate mount of claim 1 further comprising a projector attached to the mounting plate through a projector hanger attached to both the mounting plate and the projector.

8. A magnetic plate mount for supporting a digital video projector, comprising:
   a ceiling plate comprising a plurality of countersunk mount holes;
   a mounting plate comprising a plurality of magnets, a plurality of countersunk mount holes, and a plurality of counterbored slots;
   wherein the plurality of magnets are secured within the plurality of countersunk mount holes of the mounting plate; the projector attached to the mounting plate through a projector hanger attached to both the mounting plate and the projector;
   wherein a mounting surface of the mounting plate comprises the plurality of magnets, the plurality of countersunk mount holes, and the plurality of counterbored slots;
   wherein the mounting surface of the mounting plate is magnetically attached to a mounting surface of the ceiling plate;
   wherein the mounting surface of the ceiling plate and the mounting surface of the mounting plate are flush when the mounting plate is attached to the ceiling plate; and
   wherein the ceiling plate is attached to a ceiling.

9. The magnetic plate mount of claim 8 wherein the projector is a wired projector comprising a plurality of cables.

10. The magnetic plate mount of claim 9 further comprising a plurality of magnetic caps attached to at least one of a wall or the ceiling, wherein the plurality of cables are attached to the plurality of magnetic caps.

11. The magnetic plate mount of claim 10 wherein the plurality of magnetic caps are attached to at least one of the wall or the ceiling by being magnetically attached to a plurality of mounting pucks attached to at least one of the wall or the ceiling.

12. The magnetic plate mount of claim 11 wherein the plurality of mounting pucks comprise a metal material, and the plurality of mounting pucks are adhered to at least one of the wall or the ceiling.

13. The magnetic plate mount of claim 8 wherein the plurality of magnets comprise a combined linear load strength of approximately 10 kg.

14. A method of installing the magnetic plate mount of claim 8 to a ceiling comprising:
- attaching the ceiling plate to the ceiling by screwing a plurality of drywall screws into the ceiling through the plurality of countersunk mount holes in the ceiling plate;
- attaching a mounting frame of the projector hanger to the mounting plate by screwing a plurality of bolts through both the mounting frame and the plurality of counter-bored slots of the mounting plate; and
- magnetically attaching the mounting plate to the ceiling plate.

\* \* \* \* \*